United States Patent
Yun et al.

(10) Patent No.: US 10,671,562 B2
(45) Date of Patent: Jun. 2, 2020

(54) CLOCK GATING CIRCUIT

(71) Applicant: SAMSUNG ELECTRONICS CO., LTD., Suwon-si, Gyeonggi-do (KR)

(72) Inventors: Jaegeun Yun, Hwaseong-si (KR); Lingling Liao, Yongin-si (KR); Bub-chul Jeong, Yongin-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 8 days.

(21) Appl. No.: 15/887,629

(22) Filed: Feb. 2, 2018

(65) Prior Publication Data
US 2018/0157616 A1 Jun. 7, 2018

Related U.S. Application Data

(63) Continuation of application No. 14/873,485, filed on Oct. 2, 2015, now Pat. No. 9,886,414, which is a
(Continued)

(30) Foreign Application Priority Data

Jul. 25, 2011 (KR) .................. 10-2011-0073401

(51) Int. Cl.
*G06F 13/42* (2006.01)
*G06F 1/3237* (2019.01)
(Continued)

(52) U.S. Cl.
CPC ............ *G06F 13/4291* (2013.01); *G06F 1/10* (2013.01); *G06F 1/3237* (2013.01); *G06F 13/28* (2013.01);
(Continued)

(58) Field of Classification Search
CPC ........ G06F 1/3237; G06F 1/10; G06F 1/3287; G06F 13/405; Y02B 60/1221; Y02B 60/1282
See application file for complete search history.

(56) References Cited

U.S. PATENT DOCUMENTS 6,694,441 B1    2/2004  Sethia
6,971,038 B2 *  11/2005 Santhanam ............... G06F 1/08
                                                    712/220
(Continued)

FOREIGN PATENT DOCUMENTS

JP    2010-021793 A    1/2010
KR    10-2005-0122973 A   12/2005

OTHER PUBLICATIONS

ARM—"Introduction to AMBA® 4 ACE™ and big.LITTLE Processing Technology," Jun. 6, 2011 [updated Jul. 29, 2013] (15 pages) [CoreLink Intelligent System IP by ARM—Ashley Stevens, Senior FAE, Fabric and Systems].
(Continued)

*Primary Examiner* — Brian T Misiura
(74) *Attorney, Agent, or Firm* — Lee IP Law, PC

(57) ABSTRACT

A system-on-chip bus system includes a bus configured to connect function blocks of a system-on-chip to each other, and a clock gating unit connected to an interface unit of the bus and configured to basically gate a clock used in the operation of a bus bridge device mounted on the bus according to a state of a transaction detection signal.

15 Claims, 20 Drawing Sheets

Related U.S. Application Data continuation of application No. 13/556,545, filed on Jul. 24, 2012, now Pat. No. 9,152,213.

(51) Int. Cl.
| | |
|---|---|
| *G06F 1/10* | (2006.01) |
| *G06F 13/40* | (2006.01) |
| *G06F 13/28* | (2006.01) |
| *G06F 13/364* | (2006.01) |

(52) U.S. Cl.
CPC .......... *G06F 13/364* (2013.01); *G06F 13/405* (2013.01); *G06F 13/4054* (2013.01); *G06F 2213/0038* (2013.01); *Y02B 70/12* (2013.01); *Y02B 70/123* (2013.01); *Y02D 10/128* (2018.01); *Y02D 10/151* (2018.01)

(56) References Cited

U.S. PATENT DOCUMENTS

| | | | | |
|---|---|---|---|---|
| 7,117,143 | B2 * | 10/2006 | Wang | G06F 17/5027 |
| | | | | 703/25 |
| 7,196,937 | B2 * | 3/2007 | Sugio | G11C 16/10 |
| | | | | 365/185.11 |
| 7,529,960 | B2 | 5/2009 | Park et al. | |
| 8,058,900 | B1 * | 11/2011 | Rosen | H03K 19/096 |
| | | | | 326/28 |
| 8,164,374 | B2 * | 4/2012 | Irie | H03K 19/007 |
| | | | | 327/291 |
| 8,244,515 | B2 * | 8/2012 | Fernsler | G06F 1/3203 |
| | | | | 703/15 |
| 8,352,794 | B2 * | 1/2013 | Teyssier | G06F 1/10 |
| | | | | 714/34 |
| 8,438,416 | B2 | 5/2013 | Kocev et al. | |
| 8,448,001 | B1 | 5/2013 | Zhu et al. | |
| 8,448,002 | B2 | 5/2013 | Bulusu et al. | |
| 8,493,094 | B2 * | 7/2013 | Suzuki | H03L 7/00 |
| | | | | 327/23 |
| 8,612,786 | B1 | 12/2013 | Lachwani et al. | |
| 8,904,255 | B2 | 12/2014 | Takumalla et al. | |
| 9,128,703 | B1 * | 9/2015 | Lachwani | G06F 1/3203 |
| 9,270,270 | B2 | 2/2016 | Cai et al. | |
| 9,298,210 | B2 * | 3/2016 | Aoki | G06F 1/04 |
| 9,639,641 | B1 * | 5/2017 | Wilson | G06F 17/5031 |
| 2003/0135676 | A1 | 7/2003 | Jensen | |
| 2007/0162648 | A1 | 7/2007 | Tousek | |
| 2012/0246368 | A1 | 9/2012 | Kwon et al. | |

OTHER PUBLICATIONS

KR Application 10-2004-0048666, Nov. 19, 2014, Machine Translation (8 pages) Unexamined Publication No. 10-2005-0122973 (Dec. 29, 2005)—SOKOLOV.

* cited by examiner

CLOCK GATING CIRCUIT

CROSS-REFERENCE TO RELATED APPLICATIONS

This is a continuation application based on pending application Ser. No. 14/873,485, filed Oct. 2, 2015, which in turn is a continuation of application Ser. No. 13/556,545, filed Jul. 24, 2012, now U.S. Pat. No. 9,152,213 B2, the entire contents of both being hereby incorporated by reference.

This U.S. non-provisional patent application claims priority under 35 USC § 119 to Korean Patent Application No. 10-2011-0073401, filed on Jul. 25, 2011, the entirety of which is hereby incorporated by reference.

BACKGROUND

1. Field

Embodiments relate to a system-on-chip (SoC) and, more particularly, to a bus system in an SoC and a method of gating root clocks therefor.

2. Description of the Related Art

With the recent trend toward the convergence of computers, communications, and broadcasting, demands on general application specific ICs (ASICs) and application specific standard products (ASSPs) have driven demand for system-on-chips (SoCs). In addition, the light-weight, thin, short, small, and high-performance trends of information technology (IT) devices have become a factor accelerating SoC industry growth.

SUMMARY

Embodiments are directed to a system-on-chip bus system, including a bus configured to connect function blocks of a system-on-chip to each other, and a clock gating unit connected to an interface unit of the bus and configured to basically gate a clock used in the operation of a bus bridge device mounted on the bus according to a state of a transaction detection signal.

The bus may be a first bus, and the system may further include a second bus having a lower speed than the first bus.

The first bus may be a system bus and the second bus may be a peripheral bus.

The system bus may be an AXI bus and the peripheral bus may be an APB.

The clock gating unit may include a latch configured to latch and output a control selection signal applied to the APB according to the clock, and a logic gate receiving the clock and an output of the latch to generate an AND response.

The system bus may be an AHB or an ASB and the peripheral bus may be an APB.

The interface unit may be a master interface of a master device among the function blocks or of a bus switch of the bus bridge device.

The transaction detection signal may be generated by checking an outstanding count value of the master interface.

The clock gating unit may include a dynamic clock gate connected to an output terminal of the master interface and configured to output a clock gating enable signal by obtaining the outstanding count value using signals of the bus and the clock and comparing the obtained outstanding count value with a reference value, and a clock gating cell configured to provide the clock to the bus bridge or block the clock in response to the clock gating enable signal.

The dynamic clock gate may include a first counter configured to count transactions during a write operation, and a second counter configured to count transactions during a read operation.

The clock gating cell may include a latch configured to latch and output the clock gating enable signal according to the clock, and a logic gate receiving an output of the latch to generate an AND response.

The bus bridge device may be an asynchronous bridge, and the clock gating cell may receive the clock gating enable signal through a synchronizer mounted on an output terminal of the dynamic clock gate.

The bus bridge device may be an up/down bridge, and the clock gating cell may receive the clock gating enable signal through a sync up/down circuit mounted on an output terminal of the dynamic clock gate.

The bus bridge device may be an APB bus bridge, and the clock gating unit may be connected to an input terminal of a slave interface of the APB bus bridge.

Embodiments are also directed to a clock gating method, including obtaining a transaction detection signal using signals of a master interface, and basically gating a clock used in the operation of a bus bridge device mounted on a system bus according to a state of the transaction detection signal.

Embodiments are also directed to a system-on-a-chip, including a master device, a slave device, a bus coupled to the master device and the slave device, the bus being configured to transfer at least one of address, control, and data signals in at least one direction between the master device and the slave device, a bus bridge device, the bus bridge device being interposed between the master device and the slave device, and being configured to start and stop a clock tree that is provided to the slave device, and a clock gating unit coupled to the bus bridge device, the clock gating unit being configured to control the starting and stopping of the clock tree by the bus bridge device.

The system may be an ARM system and the bus may be an AXI bus.

The clock gating unit may control the starting and stopping of the clock tree by the bus bridge device using a gating clock provided from the clock gating unit to the bus bridge device, the gating clock having at least two states, the at least two states including a first state and a second state, the first state being a continuous voltage level state having a duration that is independent of a frequency of a root clock, the second state being a varying voltage level state having a frequency that is an integer multiple or fraction of the frequency of a root clock, the integer being a non-zero integer.

The frequency of the varying voltage level state in the second state may be equal to the frequency of the root clock.

The clock gating unit may be configured to provide a clock signal derived from a root clock to the bus bridge device, and the clock gating unit may be configured to control the starting and stopping of the clock tree by the bus bridge device by selectively suspending the providing of the clock signal to the bus bridge device.

BRIEF DESCRIPTION OF THE DRAWINGS

Features will become apparent to those of skill in the art by describing in detail exemplary embodiments with reference to the attached drawings in which.

DETAILED DESCRIPTION

Figure 1:
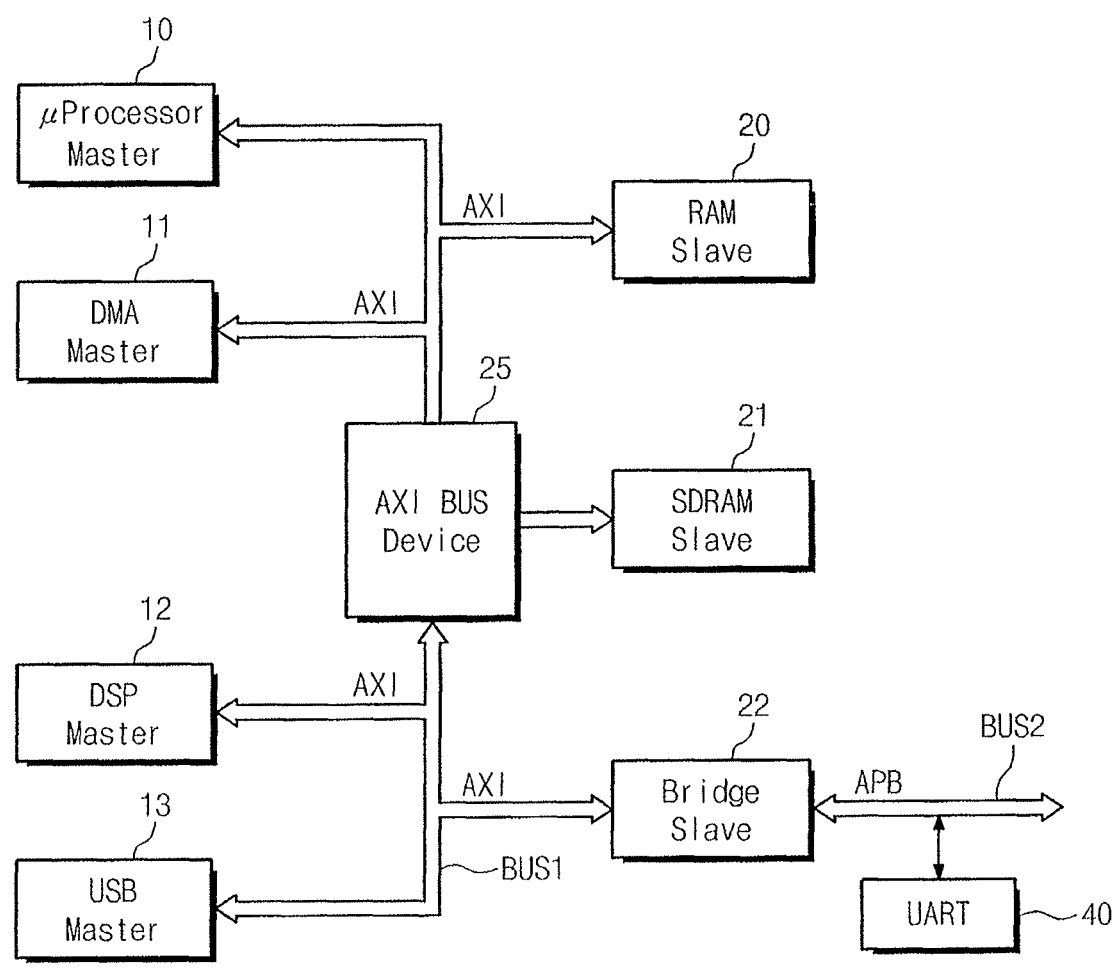
FIG. 1 illustrates a system block diagram of an SoC according to an embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of regions may be exaggerated for clarity of illustration. Like reference numerals refer to like elements throughout.

In the specification, it will also be understood that when an element or lines are referred to as being "on" a target element block, it can be directly on the target element block, or intervening another element may also be present.

The terms used in the specification are for the purpose of describing particular embodiments only and are not intended to be limiting of the invention. As used in the specification, the singular forms "a," "an," and "the" are intended to include the plural forms as well, unless the context clearly indicates otherwise. It will be further understood that the terms "comprises" and/or "comprising," when used in the specification, specify the presence of stated features, integers, steps, operations, elements, and/or components, but do not preclude the presence or addition of one or more other features, integers, steps, operations, elements, components, and/or groups thereof.

Each embodiment described and exemplified herein may include a complementary embodiment thereof. Note that descriptions of interface architectures such as an AMBA (Advanced Microcontroller Bus Architecture) bus interface architecture and their detailed basic operations may be avoided to avoid obscuring the descriptions of embodiments.

FIG. 1 illustrates a system block diagram of an SoC according to an embodiment.

FIG. 1 shows an example of an AMBA (Advanced Microcontroller Bus Architecture). The AMBA is a standard bus specification for connecting and managing the IPs in a SoC and was proposed by Advanced RISC Machines, Ltd. (ARM). The AMBA has taken the position as one-chip communication for the design of embedded microprocessors.

In the example shown in FIG. 1, an AXI bus device is mounted on an AXI bus as a backbone bus. The AXI bus device 25 may include various types of bus bridge devices such as a quality of service enhancement (QE) unit, a memory management unit (MMU), an up/down-sizer, an async bridge, a master/slave interface, and a crossbar switch.

A microprocessor 10, a DMA 11, a DSP 12, and a USB 13 may function as master IPs on a first bus BUS1 that may become an AXI bus. In addition, a RAM 20, an SDRAM, and a bridge 22 may function as slave IPs. A UART 40, which may function as a slave IP, may be connected to a second bus BUS2 that may become an APB bus.

AHB (Advanced High-Performance Bus), APB (Advanced Peripheral Bus), and AXI (Advanced eXtensible Interface) have been proposed as bus types of the AMBA. Of the above, the AXI is an interface protocol having advanced functions such as a multiple outstanding address function, a multiple outstanding transaction function, and a data interleaving function.

The multiple outstanding transaction function is a function for allowing the utilization of idle transmission time occurring between addresses by transmitting the address of each data only once through the address lines at the same time as the data is transmitted. The multiple outstanding transaction function is a parallel transaction processing function for allowing a plurality of transactions to be transmitted to a slave IP. Accordingly, one of the transactions may be selected by the slave IP to be processed first. At the same time, read and write operations may be executed via the AXI.

The data interleaving function allows data to be interleaved with each other at the slave when several masters transmit the data to one slave, thus allowing the more efficient utilization of a bandwidth as well as providing an advantage in respect of latency.

Although an AHB is not shown in FIG. 1, the AXI bus may be replaced with the AHB. Three kinds of buses are shown in FIG. 2.

Figure 2:
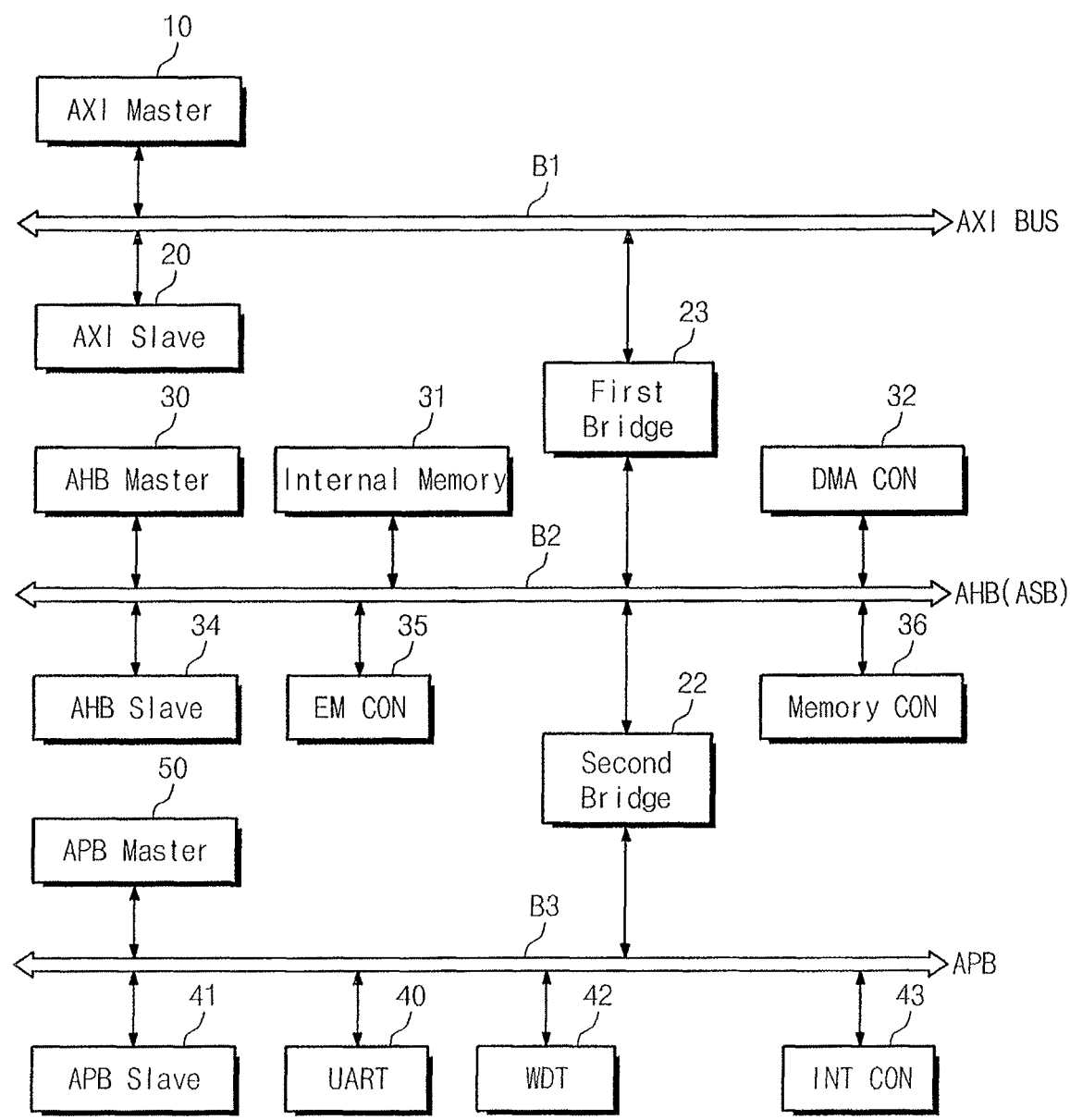
FIG. 2 illustrates a system block diagram of another SoC according to an embodiment.

FIG. 2 illustrates a system block diagram of another SoC according to an embodiment.

An AMBA architecture shown in FIG. 2 is based on AMBA 3.0.

In the example shown in FIG. 2, a bus architecture having three kinds of buses including an AXI bus B1, an AHB B2, and an APB B3 is shown. In an early-stage AMBA, two kinds of buses including an APB and an ASB were proposed. However, the ASB was replaced later with an AHB that is a high-performance bus having a burst mode. In addition, an AXI bus appeared latest, which has a channel allowing read and write operations to be performed at the same time.

In FIG. 2, an AXI master 10, an AXI slave 20, and a first bridge 20 are connected to the AXI bus B1.

An AHB master 30, an internal memory 31, a DMA controller 32, an AHB slave 34, an extended memory controller 35, a memory controller 36, and a second bridge 22 are connected to the AHB B2.

An APB master 50, an APB slave 41, a UART 40, a WDT 42, and an interrupt controller 43 are connected to the APB B3.

The APB B3 is a peripheral bus which operates at a lower speed than other buses. Therefore, the second bridge 22 is coupled between the APB B3 and the AHB B2 to cover difference in performance and speed. Similarly, the first bridge 23 is coupled between the AHB B2 and the AXI bus B1.

Although not shown in this figure, various bus bridge devices such as a quality of service enhancement (QE) unit, a memory management unit (MMU), an up/down-sizer, an async bridge, a master/slave interface, and a crossbar switch may be mounted on the AXI bus B1 and coupled between the AXI master 10 and the AXI slave 20.

For the operation of such a bus bridge device, a clock is provided through a clock tree buffer. By providing the clock, power consumption still occurs at the clock tree buffer even when a logic unit or a slave IP of the bus bridge device is temporarily in an idle state. As a result, a more detailed technique of clock gating for the bus bridge device may optimally reduce power consumption of a system-on-chip. For example, when the power consumed in the clock tree buffer of the bus bridge device is more than tens of percent of the gross switching power, a clock gate scheme may be useful in efficiently cutting off the power of the clock tree buffer.

Figure 3:
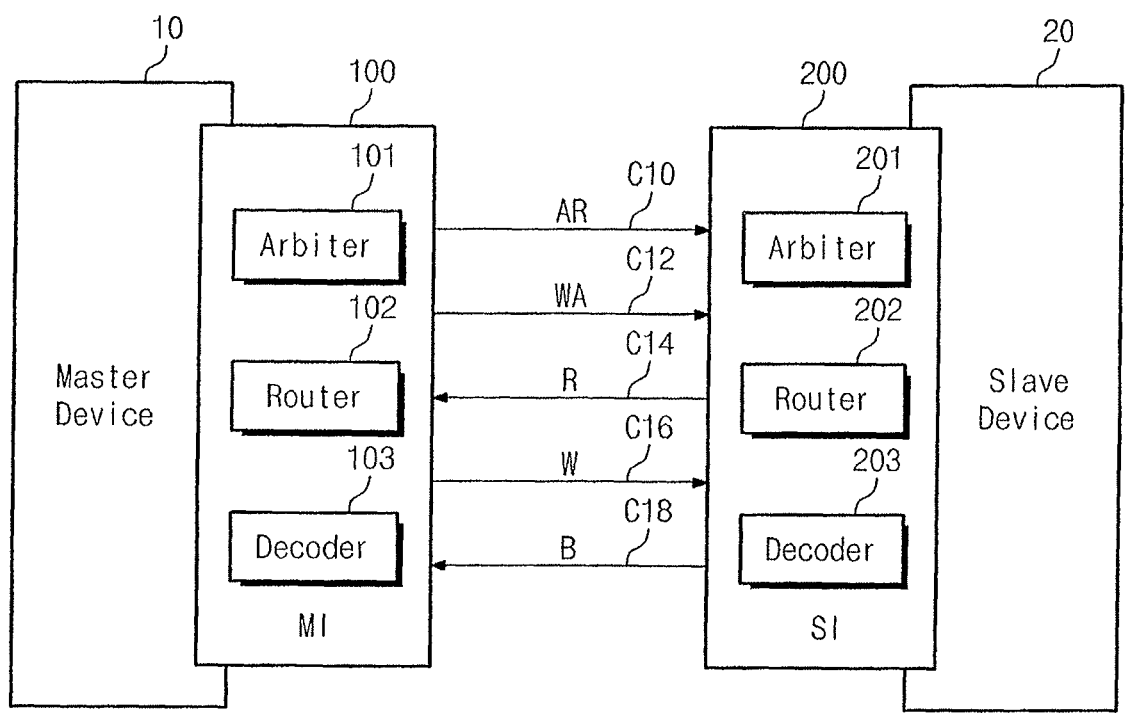
FIG. 3 illustrates a bus channel and an interface applied to FIG. 1 or 2.

FIG. 3 illustrates a bus channel and an interface applied to FIG. 1 or 2. In the example shown in FIG. 3, there are five channels of an AXI bus, the five channels including an AR (C10) indicating a read address channel, a WA (C12) indicating a write address channel, a R (C14) indicating a read data channel, a W (C16) indicating a write data channel, and a B (C18) indicating a write response channel.

The above channels are coupled between the master device 10 and the slave device 20 through interfaces. A master interface (MI) 100 exists in the master device 10, and a slave interface (SI) 200 exists in the slave device 20. When the slave device 20 acts as a master device, the slave interface 200 also becomes a master interface. That is, a master device may turn into a slave device and a slave device turn into a master device according to the operating environment.

The master interface 100 may include an arbiter 101, a router 102, and a decoder 103. The slave interface 200 may include an arbiter 201, a router 202, and a decoder 203. In FIG. 3, it is shown that the routers 102 and 202 are included in the master device 10 and the slave device 20, respectively.

Maximum sixteen master devices 10 and slave devices 20 may be connected to one AMBA bus.

Figure 4:
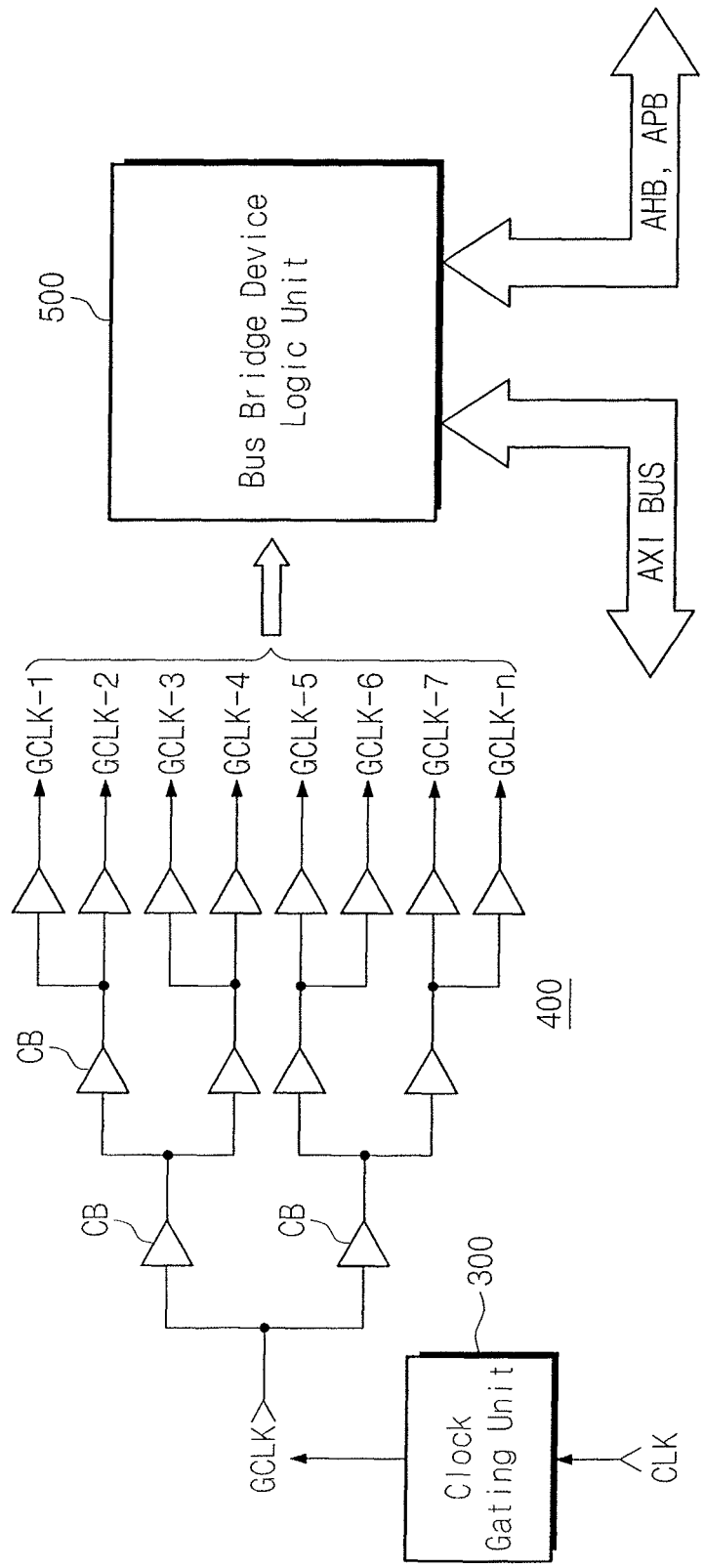
FIG. 4 illustrates a conceptual diagram of root clock gating according to an embodiment.

FIG. 4 illustrates a conceptual diagram of root clock gating according to an embodiment.

In the example shown in FIG. 4, a clock tree buffer 400 provides a clock to a bus bridge device logic unit 500 in an AXI bus.

Figure 5:
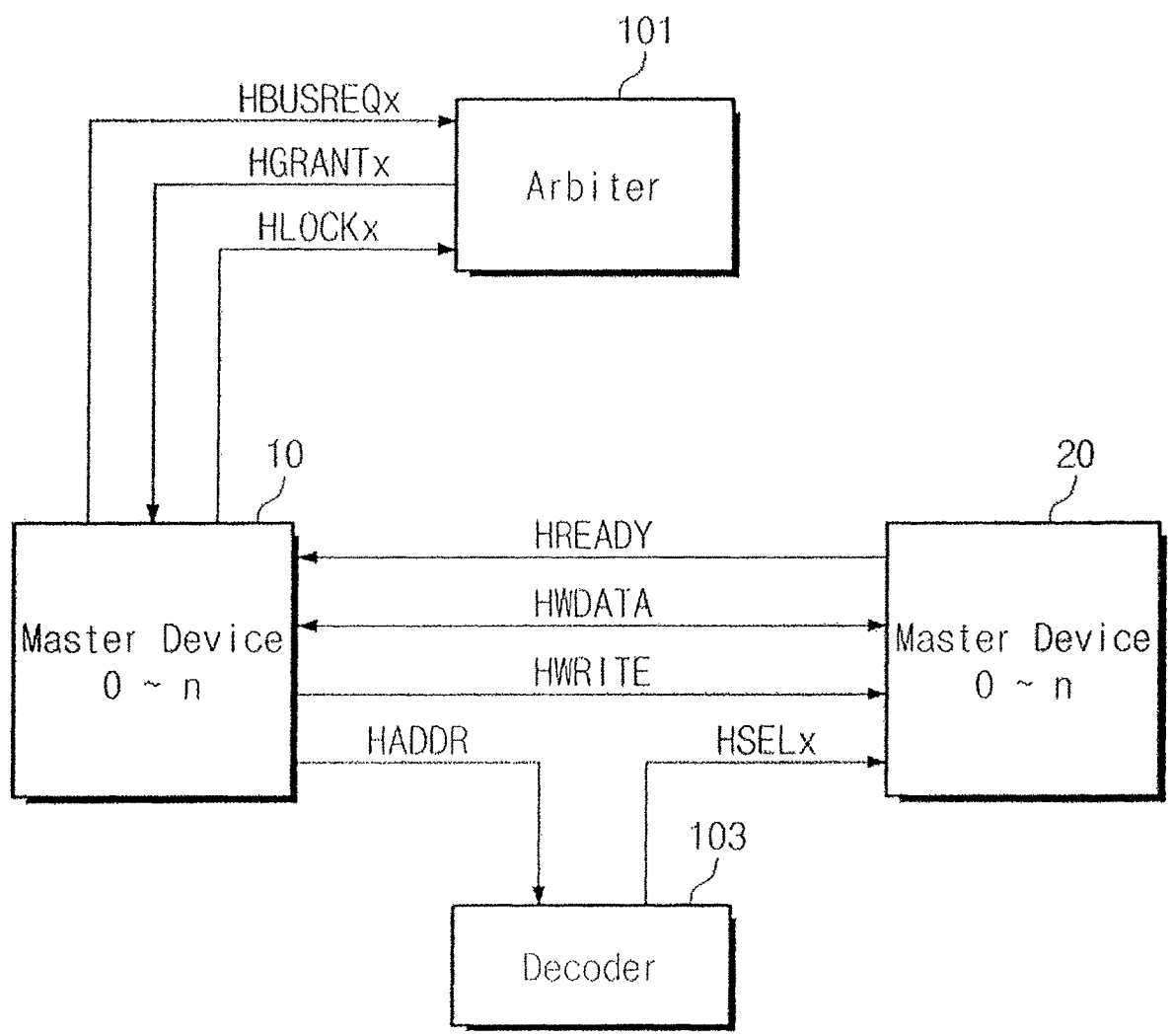
FIG. 5 illustrates signal wiring of bus interfacing according to FIG. 3.

FIG. 5 illustrates signal wiring of bus interfacing according to FIG. 3

Referring to FIG. 5, first, the master device 10 transmits a bus use request signal $HBUSREQ_X$ to the arbiter 101. The subscript "X" of the bus use request signal $HBUSREQ_X$ is a naming ID of a master device. The arbiter 101 transmits a bus use grant signal $HGRANT_X$ to the master device 10. The bus use grant signal $HGRANT_X$ indicates the bus use grant by checking a bus occupy state. The master device 10 receiving the bus use grant transmits a signal $HLOCK_X$ to the arbiter 101. The signal $HLOCK_X$ means that other master devices are not allowed to use a bus because the master device 10 will use the bus from now on.

The master device 10 obtaining a right to use the bus transmits a signal HADDR to the decoder 103. The signal HADDR means an address of the desired slave device 20. The decoder 103 transmits a signal $HSEL_X$ to the corresponding slave device 20. The signal $HSEL_X$ includes the meaning of "slave device, you are selected by me". Thus, the corresponding slave device 20 becomes enabled.

The master device 10 transmits a signal HWRITE of high level to write data. If the master device 10 transmits a signal HWRITE of low level, it is recognized that the selected slave device 20 is required to read the data. In response to the signal HWRITE, the slave device 20 transmits a signal HREADY to the master device 10. The signal HREADY includes the meaning of "master device, I am ready to write/read the data; please perform the operation." Thus, the master device 10 confirming the signal HREADY transmits a signal HWDATA to the slave device 20 during a write operation and receives a signal HRDATA from the slave device 20 during a read operation. In the read operation, a burst mode operation may be performed to provide data once and successively read the data. For example, the burst mode may employ an incremental manner in which data size continues to be incremented by HSIZE (32 bits=4 bytes, address is incremented by four, and a start address is a least significant bit "00").

As a power consumed in a tree buffer of a bus bridge device increases, a clock gating scheme may be used to mitigate or avoid increased power consumption. An example of the clock gating scheme is illustrated in FIG. 4.

Referring to the example shown in FIG. 4, the block tree buffer 400 includes a plurality of clock buffers CB constituting a tree structure. The block buffers CB may have different delay times, respectively.

It may be helpful in power saving of the entire system if a power consumed in the clock tree buffer 400 is not wasted when the bus bridge device logic unit 500 is in a non-operating or idle state. With this aim, the clock gating unit 300 receives a clock CLK to provide a gating clock GCLK to the clock tree buffer 400.

The gating clock GCLK is a clock generated as a result of dynamic clock gating and is not a clock-type signal but a signal maintained at a low level.

In a recent bus, a pipeline structure is widely used to enhance a bus throughput and an async design for globally asynchronous locally synchronous (GALS) is common. Accordingly, lots of flip-flops may be adapted with the increase of gate count. For this reason, a ratio of the power consumed in a clock tree buffer may increase and, in certain cases, may reach more than 40 percent. It is therefore expected that effective clock gating would be useful in reducing overall system power consumption.

Figure 6:
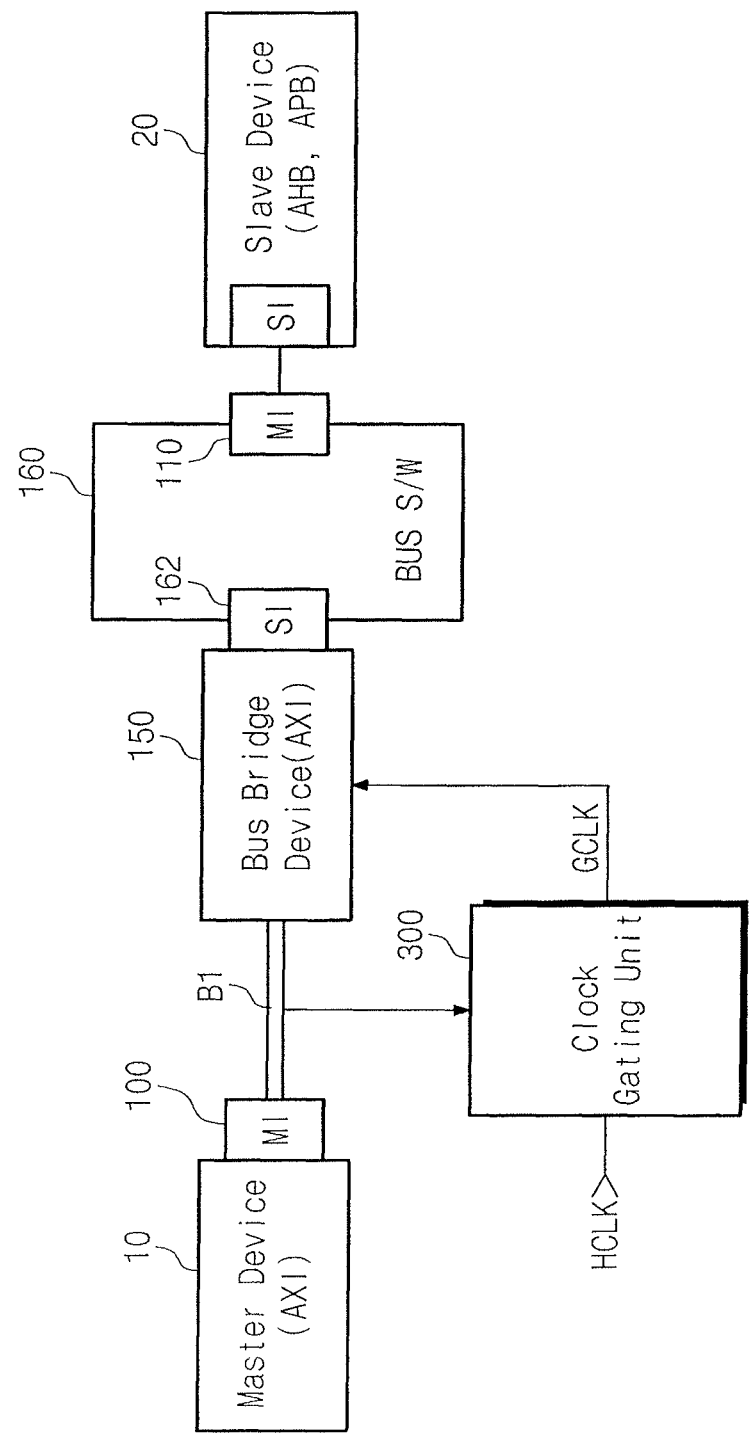
FIG. 6 illustrates a block diagram of a bus system of an SoC according to an embodiment of FIG. 5.

FIG. 6 illustrates a block diagram of a bus system of an SoC according to an embodiment of FIG. 5.

Referring to FIG. 6, the slave device 20 is connected to the master device 10 through a bus bridge device 150.

In case of an AXI bus B1, the clock gating unit 300 is connected to a master interface MI of the master device 10 of the AXI bus B1 and basically gates a clock used for the operation of a bus bridge device 150 mounted at the AXI bus B1 according to a state of a transaction detection signal. A clock HCLK applied to the clock gate unit 300 is gated with the transaction detection signal as a gating clock GCLK. The clock HCLK is not applied to a clock tree buffer when an internal logic unit of the bus bridge device 150 does not operate or is in a standby state. Thus, there is no power consumed in the clock tree buffer.

In FIG. 6, a bus switch (also called crossbar switch) 160 is shown separately. However, the bus switch 160 may be included in the bus bridge device 150. The bus switch 160 may also include a slave interface 162 and a master interface 110.

Figure 7:
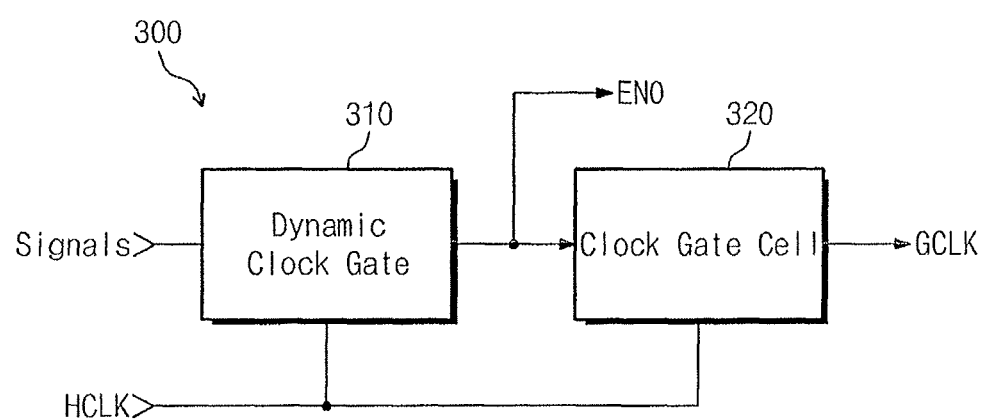
FIG. 7 illustrates a detailed block diagram of an example of a clock gating unit in FIG. 6.

An example of the clock gating unit 300 is shown in FIG. 7.

FIG. 7 illustrates a detailed block diagram of an example of the clock gating unit 300 in FIG. 6. As illustrated in FIG. 7, the clock gating unit includes a dynamic clock gate 310 and a clock gating cell 320.

The dynamic clock gate 310 is connected to an output terminal of the master interface MI. After obtaining an outstanding count value using signals of the bus and the clock HCLK, the dynamic clock gate 310 compares the outstanding count value with a reference value to output a clock gating enable signal EN0. In case of an AXI bus, the transaction detection signal may be generated by checking the outstanding count value of the master interface MI.

The clock gating cell 320 provides the clock HCLK to the bus bridge device 150 or blocks the clock HCLK in response to the clock gating enable signal EN0.

A request/data is generally transmitted through a bus while there is transaction, but most functions of a bus system are stopped when there is no transaction. Accordingly, if root clock gating on clock supply is done by inserting a circuit configured to determine whether there is transaction into the clock gating unit 300, the power consumed in the clock tree buffer in the bus bridge device 150 may be blocked or minimized.

In case of the AXI bus, an outstanding count is checked to determine whether there is transaction.

Figure 8:
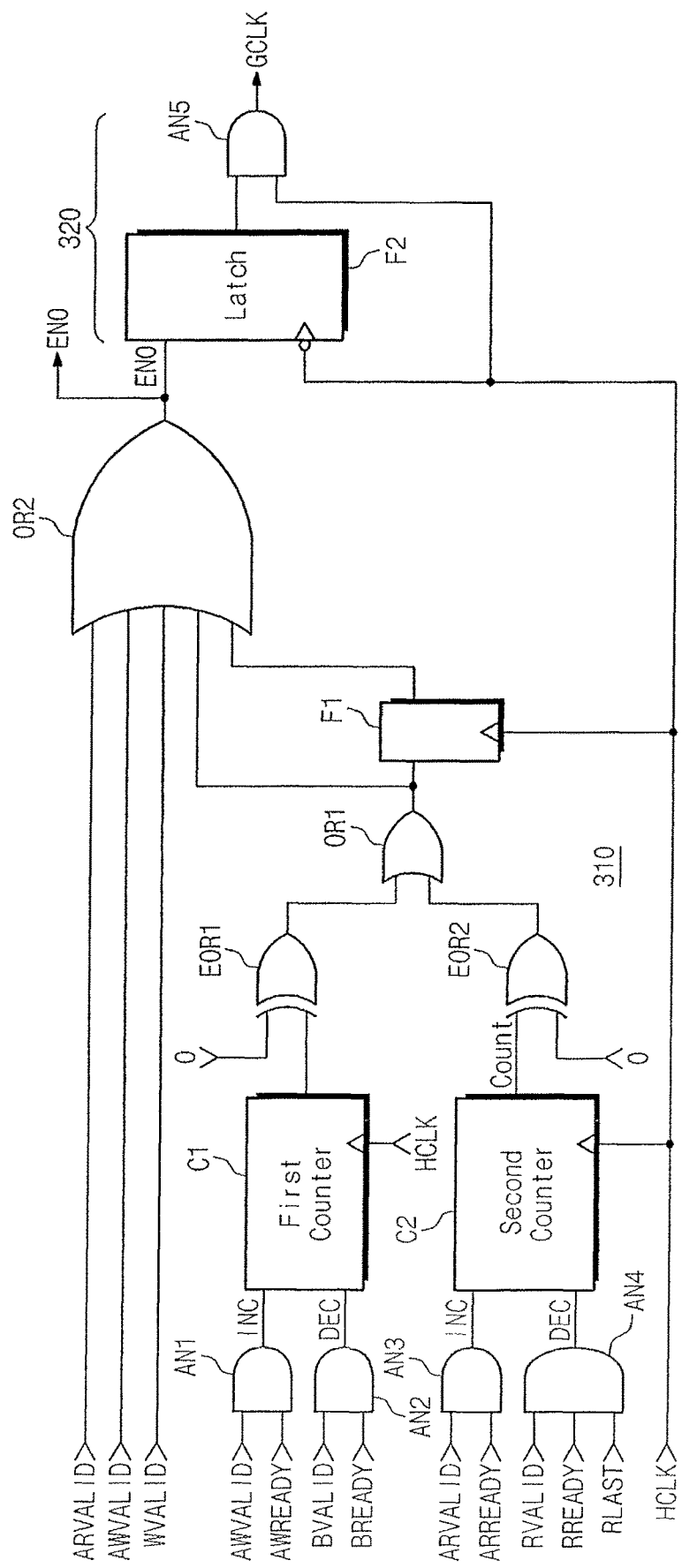
FIG. 8 illustrates an exemplary detailed circuit diagram of FIG. 7.

FIG. 8 illustrates an exemplary detailed circuit diagram of FIG. 7.

Referring to FIG. 8, the dynamic clock gate 310 includes a first counter C1 configured to count transaction during a write operation, and includes a second counter C2 configured to count transaction during a read operation. In addition, first and second comparators EOR1 and EOR2, constituting the dynamic clock gate 310, perform respective comparisons to determine whether output values of the first and second counters C1 and C2 are "0", respectively. A first OR gate OR1 receives the compared output values of the first and second counters C1 and C2 (via the first and second comparators EOR1 and EOR2) to generate an OR response. A flip-flop F1 latches and outputs an output of the first OR gate OR1. A second OR gate OR2 receives a valid read address ARVALID, a valid write address AWVALID, valid write data WVALID, the output of the first OR gate OR1, and an output of the flip-flop F1 to generate an OR response.

Four AND gates AN1-AN4 may be connected to front ends of the first and second counters C1 and C2. The first AND gate AN1 receives the valid write address AWVALID and a write address ready signal AWREADY to generate an AND response, and applies the AND response to an increase input terminal INC of the first counter C1. The second AND gate AN2 receives a valid write response signal BVALID and a write response ready signal BREADY to generate an AND response, and applies the AND response to a decrease input terminal DEC of the first counter C1. The third AND gate AN3 receives a valid read address signal ARVALID and a read address ready signal ARREADY to an AND response, and applies the AND response to an increase input terminal INC of the second counter C2. The fourth AND gate AN4 receives valid read data RVALID, a read signal RREADY, and a read last signal LAST to generate an AND response and applies the AND response to a decrease input terminal DEC of the second counter C2.

In FIG. 8, the clock gating cell 320 includes a latch F2 configured to latch and output the clock gating enable signal EN0 according to the clock HCLK, and includes an AND gate AN5 receiving the clock HCLK and an output of the latch F2 to generate an AND response.

Figure 9:
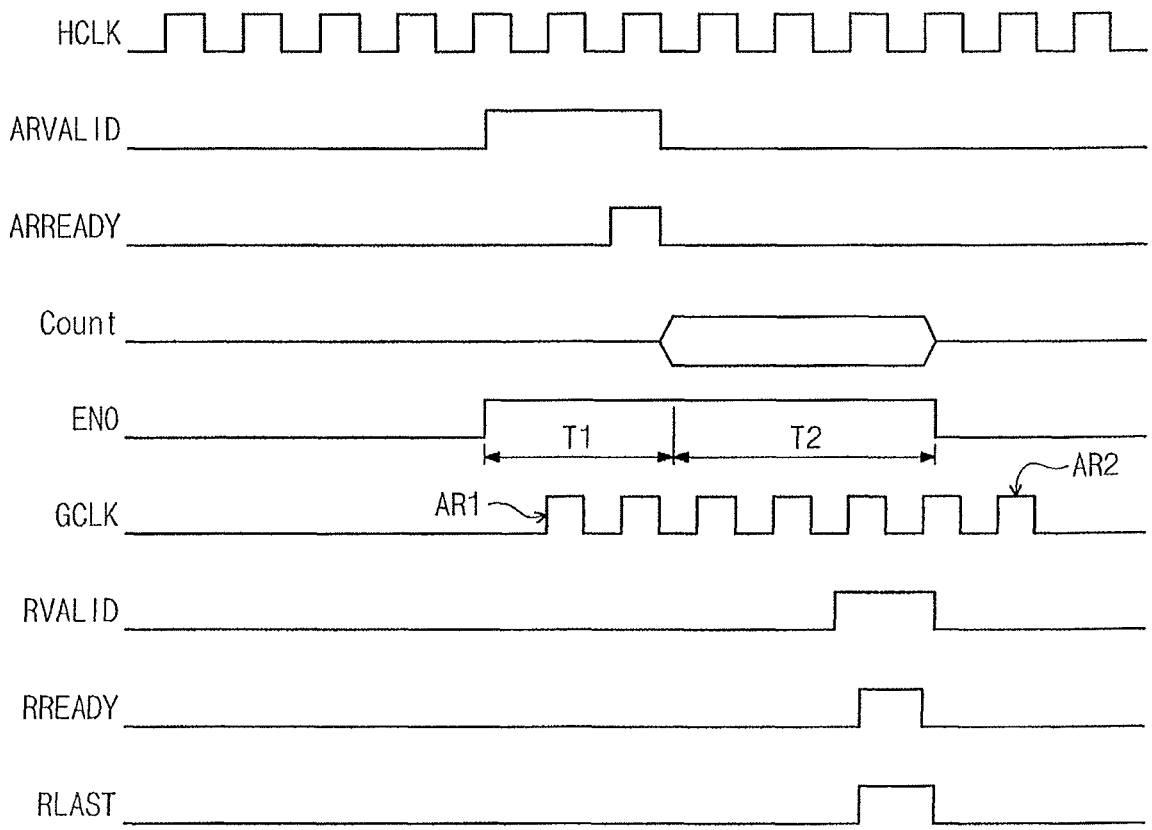
FIG. 9 illustrates a timing diagram associated with FIG. 8.

FIG. 9 illustrates a timing diagram associated with FIG. 8.

In FIG. 9, a waveform HCLK represents the applied input clock HCLK in FIG. 8.

The third AND gate AN3 performs an AND gating for input signals of waveforms ARVALID and ARREADY, and applies a result of the AND gating to the increase input terminal INC of the second counter C2.

The fourth AND gate AN4 performs an AND gating for input signals of waveforms RVALID, PREADY, and PLAST, and applies a result of the AND gating to the decrease input terminal DEC of the second counter C2.

Since there is no transaction when an output count value of the second counter C2 is "0" and there is transaction when the output count value of the second counter C2 is not "0", the output of the second counter C2 exhibits a waveform COUNT for a period T2 when there is the transaction. For this reason, an output of the first OR1 gate is logic "high." Accordingly, the lock gating enable signal EN0 appearing at an output terminal of a second OR gate OR2 may exhibit a waveform EN0 having a high level for periods T1 and T2. For the period T1, the high level is generated by a high period of the waveform RVALID. For the period T2, the high level is generated by the output count value of the second counter C2. As a result, the clock HCLK is applied to a clock buffer tree for a combined period of the periods T1 and T2 and is not applied to the clock buffer tree for the other periods. For this, the gating clock GCLK like a waveform GCLK is output to the AND gate AN5 shown in FIG. 8. One clock is additionally added to the gating clock GCLK to achieve operating stability. In the gating clock GCLK, clocking starts from an arrow AR1 and is terminated at an arrow AR2.

The operation timing in FIG. 9 is an example of the gating clock GCLK that may be generated in a read operation mode. The gating clock GCLK may also be generated based on a similar operation principle in write operation mode. Although it has been described that clock gating is performed to block the supply of a clock when an outstanding count is "0," it will be understood that the clock gating may also be conducted by another implementation operation.

Figure 10:
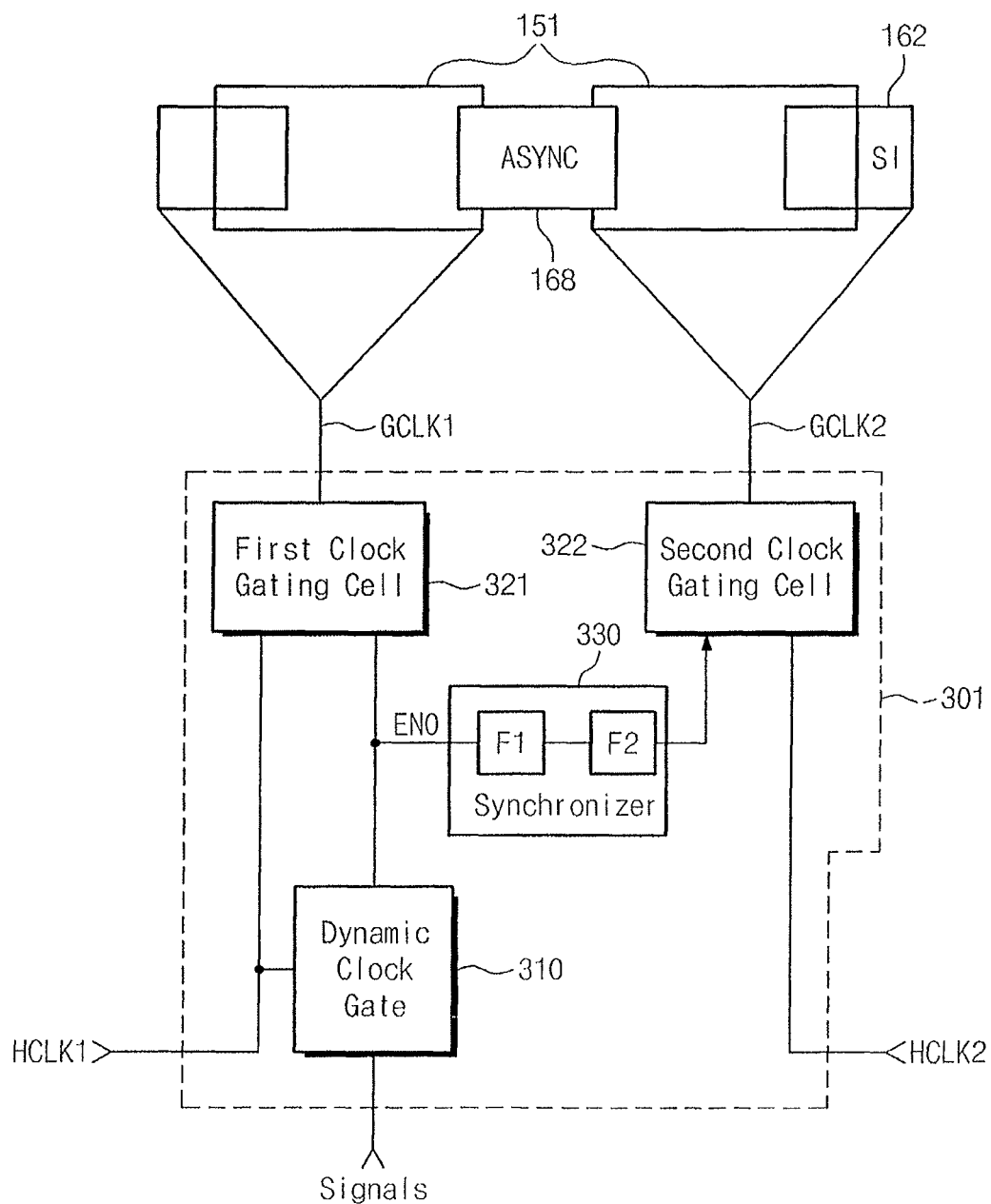
FIG. 10 illustrates a detailed block diagram of another example of the clock gating unit in FIG. 6.

FIG. 10 illustrates a detailed block diagram of another example of the clock gating unit in FIG. 6.

FIG. 10 may be applied when the bus bridge device 151 is an asynchronous bridge 168.

In FIG. 10, the clock gating unit 301 includes a dynamic clock gate 310, first and second gating cells 321 and 322, and a synchronizer 330. In this case, the second clock gating cell 322 receives the clock gating enable signal EN0 through the synchronizer 330 that is additionally mounted at an output terminal of the dynamic clock gate 310. The synchronizer 330 serves to adjust clock synchronization.

Due to characteristics of an asynchronous bridge, a frequency of a gate clock GCLK1 output from the first clock gating cell 321 and a frequency of a gating clock GCLK2 output from the second clock gating cell 322 may be different from each other.

Figure 11:
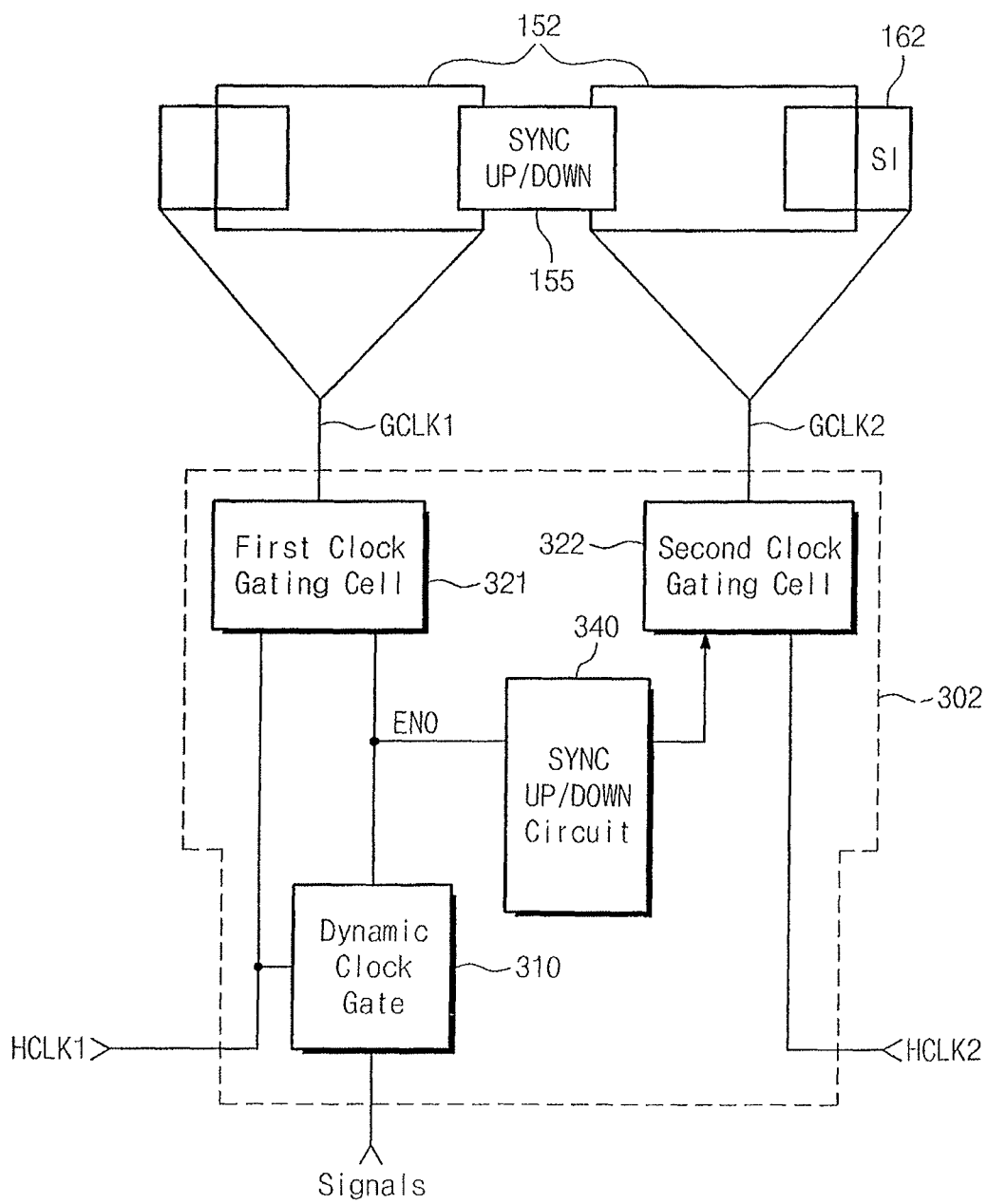
FIG. 11 illustrates a detailed block diagram of further another example of the clock gating unit in FIG. 6.

FIG. 11 illustrates a detailed block diagram of further another example of the clock gating unit in FIG. 6. FIG. 11 may be applied when the bus bridge device 152 is a sync up-down bridge 155.

In FIG. 11, a clock gating unit 302 includes a dynamic clock gate 310, first and second gating cells 321 and 322, and a sync up/down circuit 340. In this case, the second clock gating cell 322 receives the clock gating enable signal EN0 through the sync up/down circuit 340 that is additionally mounted at an output terminal of the dynamic clock gate 310. The sync up/down circuit 340 performs a function for sync-up or sync-down.

Due to characteristics of a sync up-down circuit, a frequency of a gate clock GCLK1 output from the first clock gating cell 321 and a frequency of a gating clock GCLK2 output from the second clock gating cell 322 may be different from each other.

The scheme described in FIGS. 10 and 11 may reduce overhead resulting from separate mounting of dynamic clock gates when there are async, sync-up, and sync-down bridges.

Figure 12:
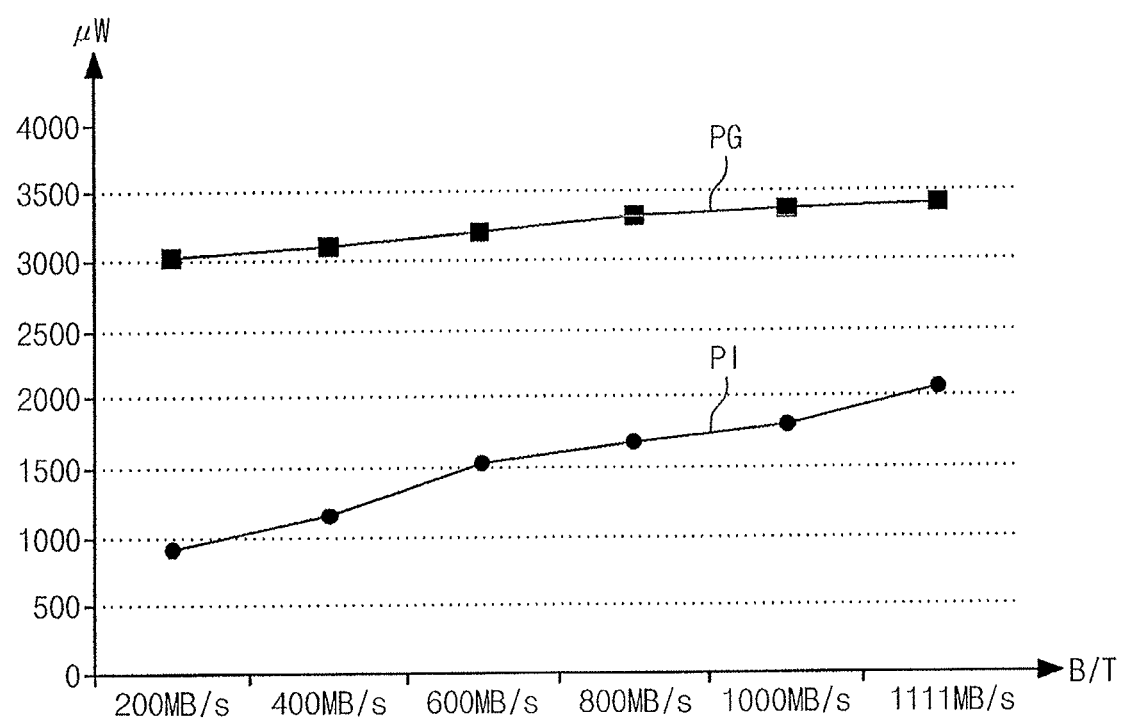
FIG. 12 illustrates a graphic diagram showing reduction of power consumption according to FIG. 6.

FIG. 12 illustrates a graphic diagram showing reduction of power consumption according to FIG. 6.

In FIG. 12, a horizontal axis represents a bus traffic B/T and a vertical axis represents a power of microwatt (μW) level. In the horizontal axis, the bus traffic from 200 MB per second to 1111 MB per second is shown. In the vertical axis, the power magnitude from 500 μW to 4000 μW is shown. As compared to a graph PG indicating a typical case, a graph PI depicting the effect according to an embodiment shows that the embodiment represented by PI may use less than half of the power used by the typical case represented by PB. When the graphs in FIG. 12 were made, a frequency of a first gating clock GCLK1 of an AXI bus was given by 333 MHz and a frequency of a second gating clock GCLK2 of the AXI bus was given by 200 MHz.

Thus, root clock gating according to an embodiment may significantly reduce or minimize a power consumed in a clock buffer tree.

Figure 13:
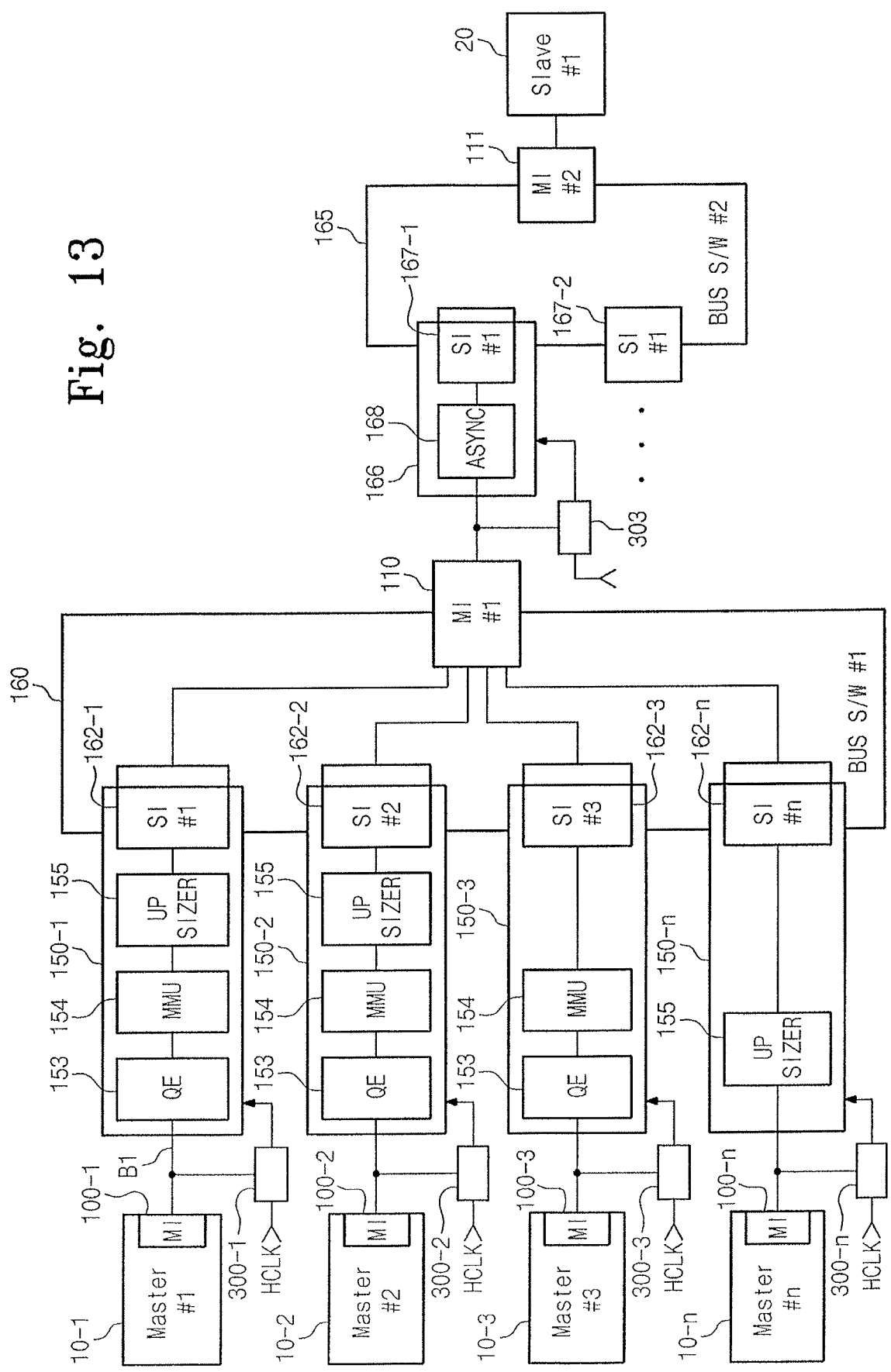
FIG. 13 illustrates a block diagram of a bus system in an SoC according to a modified embodiment of FIG. 6.

FIG. 13 illustrates a block diagram of a bus system in an SoC according to a modified embodiment of FIG. 6.

Referring to FIG. 13, the bus system has a structure in which n (n being two or greater integer) bus bridge devices, e.g., 150-1, 150-2, 150-3, and 150-n are connected to a plurality of master devices, e.g., 10-1, 10-2, 10-3, and 10-n.

FIG. 13 shows a vertically and horizontally extending version of the structure shown in FIG. 6. As compared to FIG. 6, there are two bus switches 160 and 165, and a first switch 160 has n slave interfaces. For the convenience of drawing, it is shown that the second switch 165 has two slave interfaces.

In case of parallel and cascade connection, the clock gating unit 300 described in FIG. 6 may be mounted to correspond to each master interface MI. In FIG. 13, the clock gating unit 300 is not mounted because there are master interfaces MI corresponding to the master devices 10-1, 10-2, 10-3, and 10-n, and a slave 20 is connected to a master interface 111 in a second bus switch 165.

In FIG. 13, a plurality of clock gating units 300-1, 300-2, 300-3, 300-n, and 303 have the same function as the clock gating unit 300.

Due to a clock gating function of the clock gating unit 300-1, an operation of the bus bridge device 150-1 (including a QE 153, an MMU 154, an UPSIZER 155, and a slave interface 162-1) is stopped on the AXI bus B1. Thus, the range of the clock gating function of the clock gating unit 300-1 extends from the QE 153 to the slave interface 162-1.

The clock gating function of the clock gating unit 303 covers the bus bridge device 166 including an async bridge 168 and a slave interface 167-1.

Figure 14:
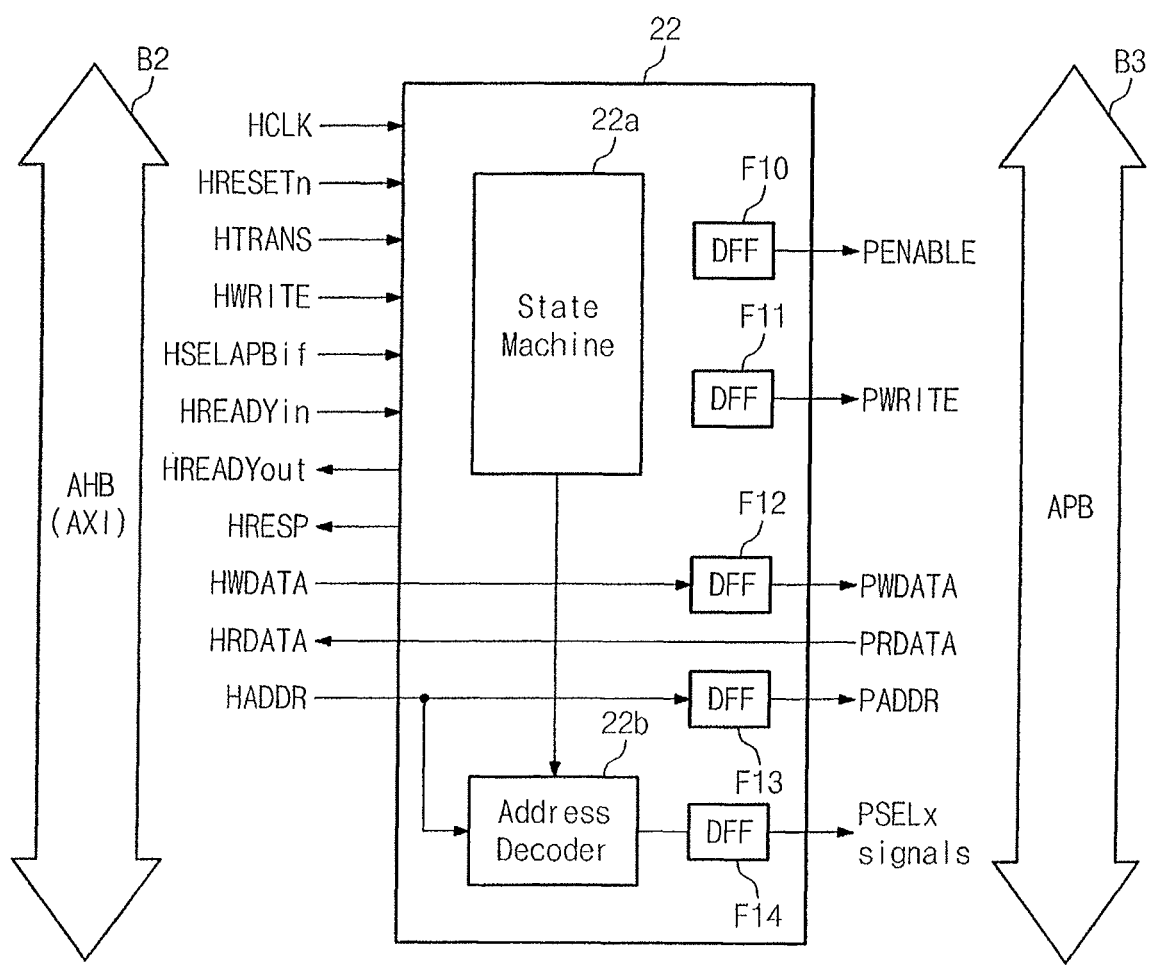
FIG. 14 illustrates a block diagram of an APB bridge connected to an APB in FIG. 1 or 2.

FIG. 14 illustrates a block diagram of an APB bridge connected to an APB in FIG. 1 or 2.

In the example shown in FIG. 14, an APB bridge 22 coupled between the AHB B2 and the APB B3 includes a state machine 22a, an address decoder 22b, and a plurality of D flip-flops F10-F14. The AHB B2 may be replaced with an AXI bus.

In another embodiment, a control selection signal PSELx obtained from the D flip-flop F14 is used as a transaction detection signal to perform clock gating at the APB B3.

Figure 15:
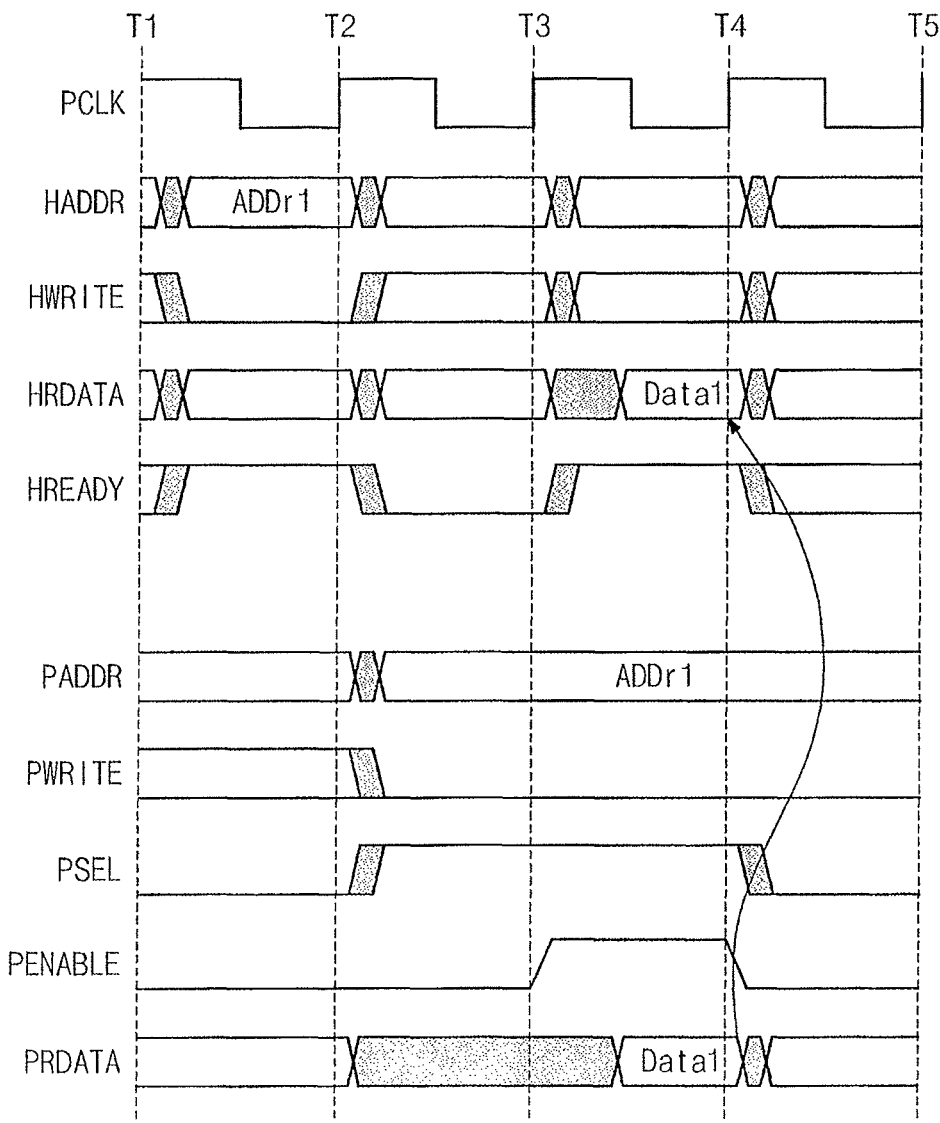
FIG. 15 illustrates a timing diagram of a bus read operation according to FIG. 14.
Figure 16:
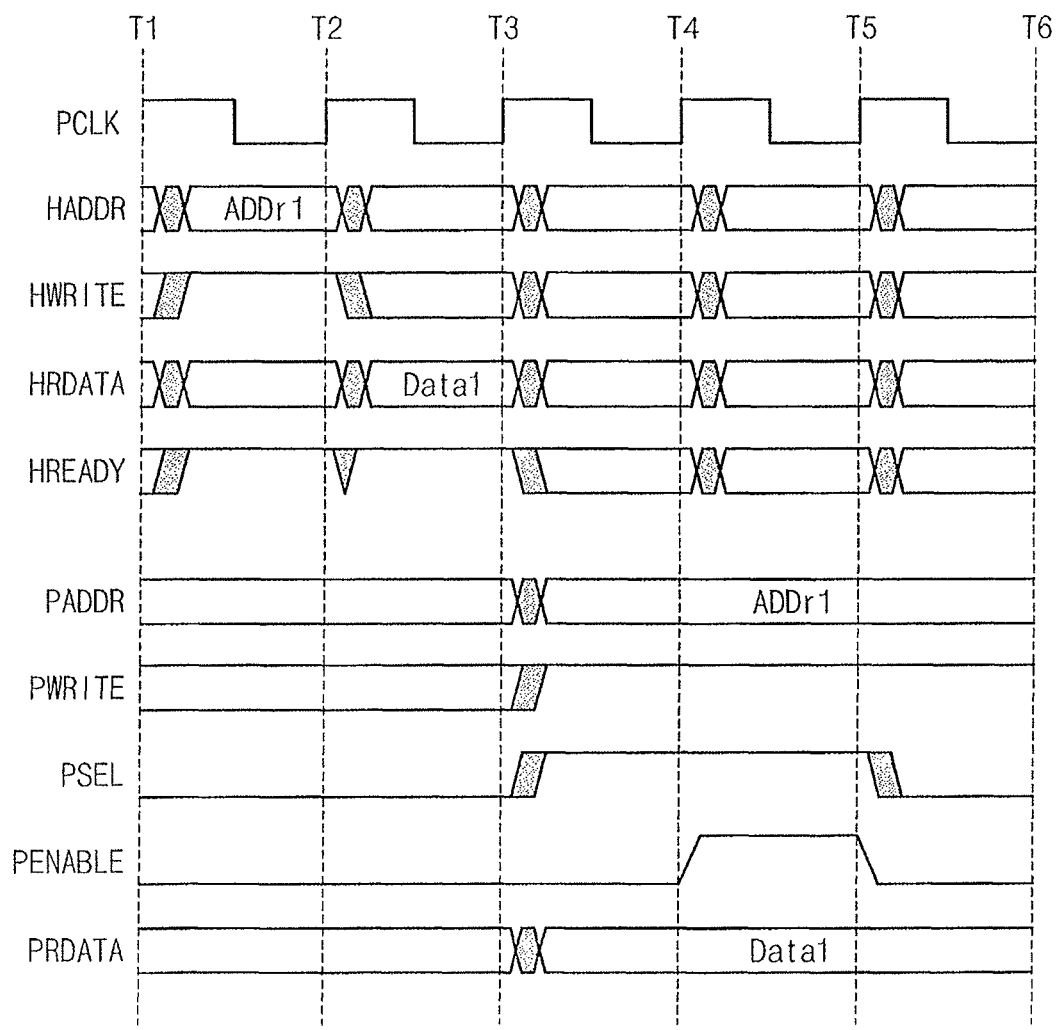
FIG. 16 illustrates a timing diagram of a bus write operation according to FIG. 14.

Various signals shown in FIG. 14 are described in FIGS. 15 and 16 illustrating read and write operations in AHB to APB bridges and in the AMBA (Advanced Microcontroller Bus Architecture).

FIG. 15 illustrates a timing diagram of a bus read operation according to FIG. 14, and FIG. 16 illustrates a timing diagram of a bus write operation according to FIG. 14.

Figure 17:
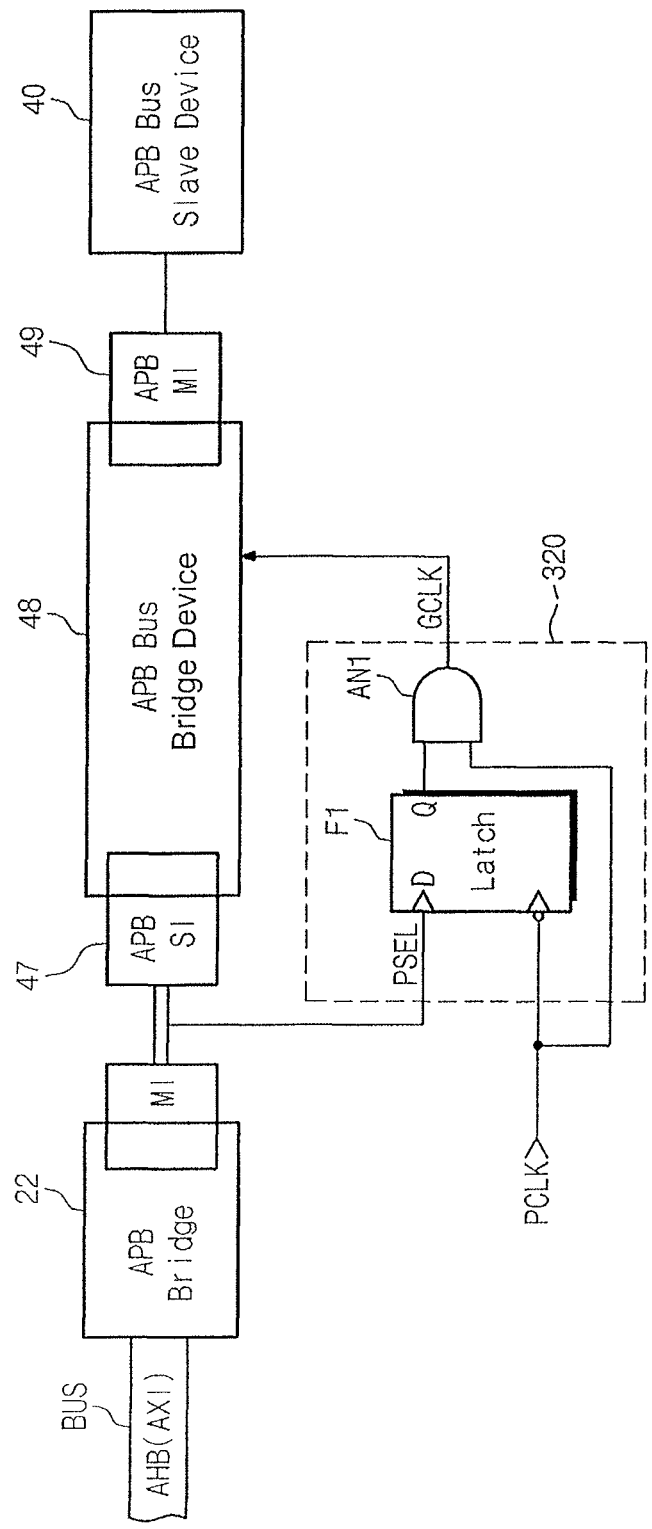
FIG. 17 illustrates a block diagram of a bus system in an SoC according to another embodiment of FIG. 5.

Waveforms PSEL shown in FIGS. 15 and 16 are used as the control selection signal PSELx through FIG. 17.

FIG. 17 illustrates a block diagram of a bus system in an SoC according to another embodiment of FIG. 5.

In the example shown in FIG. 17, the clock gating unit 320 for basically gating a clock PCLK used in operation of an APB bus bridge device 48 according to a state of a transaction detection signal is connected to the front end of an APB slave interface 47. The clock gating unit 320 includes a latch F1 configured to latch and output a control selection signal PSEL applied to the APB according to the clock and an AND gate AN1 receiving the clock and an output of the latch to generate an AND response.

In case of the APB, the clock PCLK is provided to a block buffer tree or a block buffer of the bus bridge device 48 while the control selection signal PSEL is high, and the clock PCLK is not provided thereto while the control selection signal is low. Accordingly, since a clock is not applied in an idle operation of the bus bridge device 48, power saving may be achieved.

In FIG. 17, a master interface MI of the APB bridge 22 may be omitted. Accordingly, the control selection signal PSEL of the clock gating unit 320 may be provided from the front end of the APB slave interface 47.

The APB bus bridge device 48 is connected to the APB slave device 40 through an APB master interface 49.

Since all requests start from a slave interface, power saving may occur on all bus bridge devices receiving the APB clock PCLK when a clock gating unit is mounted on a slave interface of a 1:n APB bus.

Figure 18:
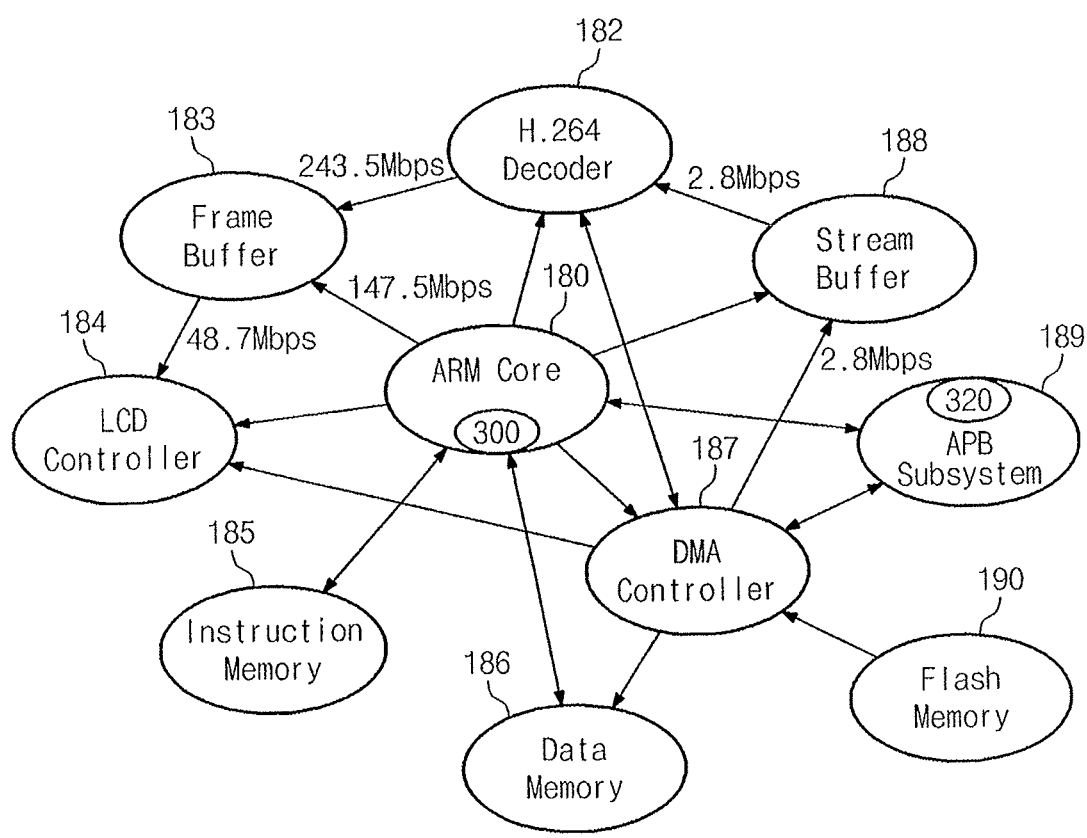
FIG. 18 illustrates a block diagram of an example embodiment as applied to a multimedia device.

FIG. 18 illustrates a block diagram of an example embodiment as applied to a multimedia device.

Referring to FIG. 18, an ARM core 180 is connected to a decoder 182, a frame buffer 183, an LCD controller 184, an instruction memory 185, a data memory 186, a DMA controller 187, an APB subsystem 189, and a stream buffer 188 for general purpose processing such as image editing, MP3 decoding, and traffic scheduling.

When the clock gate unit 300 such as shown in FIG. 7 is mounted on the ARM core 180 or the clock gating unit 320 shown in FIG. 17 is mounted on the APB subsystem 189, a power consumed in a clock buffer tree of a bus bridge device may be reduced or minimized.

Figure 19:
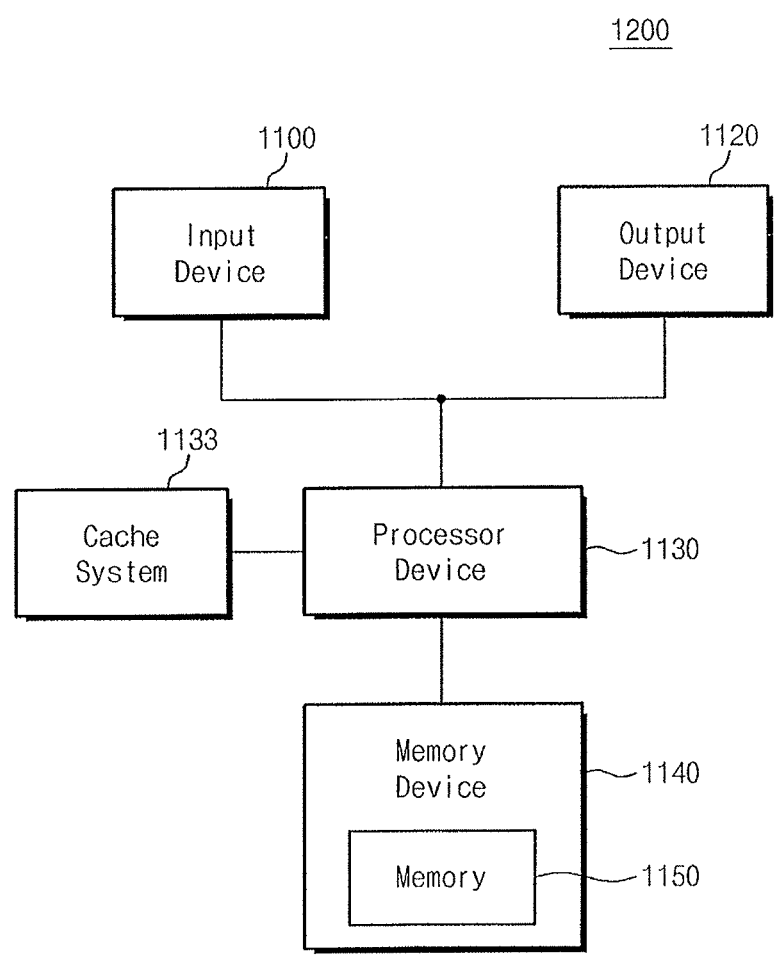
FIG. 19 illustrates a block diagram of another example embodiment as employed in an electronic system.

FIG. 19 illustrates a block diagram of another example embodiment as employed in an electronic system.

Referring to FIG. 19, an electronic system 1200 includes an input device 1100, an output device 1120, a processor device 1130, a cache system 1133, and a memory device 1140.

The processor device 1130 may include a clock gating unit according to an embodiment. The processor device 1130 controls the input device 1100, the output device 1120, and the memory device 1140 through corresponding interfaces, respectively. By using a clock gating unit according to an embodiment in the processor device 1130, power saving may be achieved in an idle state. Thus, the power performance of the electronic system employing the processor device 1130 may be enhanced.

Figure 20:
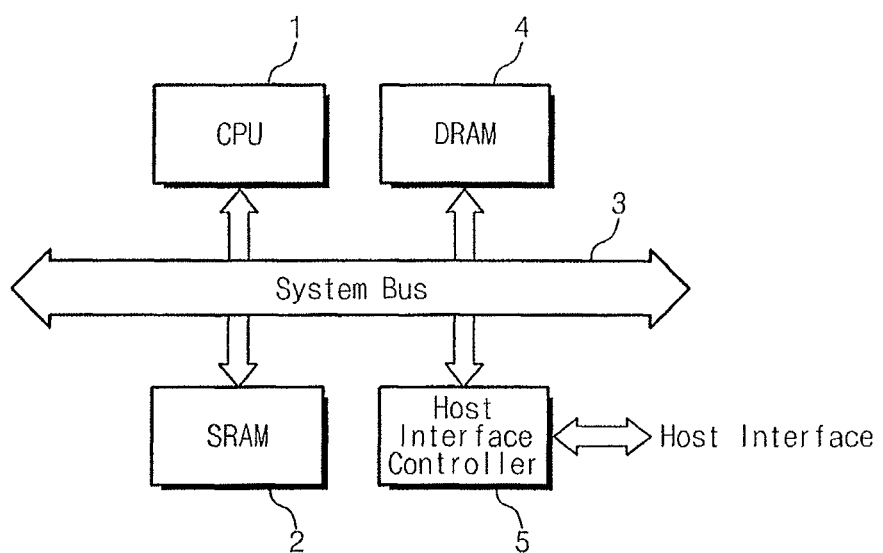
FIG. 20 illustrates a block diagram of another example embodiment as employed in a portable terminal.

FIG. 20 illustrates a block diagram of another example embodiment as employed in a portable terminal.

Referring to FIG. 20, a portable terminal such as a portable multimedia player (PMP), a cellular phone, or a smart phone may include a central processing unit (CPU) 1, a static random access memory (SRAM) 2, a dynamic RAM (DRAM) 4, and a host interface controller 5 which are connected through a system bus.

In case of a portable terminal such as a smart phone or the like, compactness and power consumption of the portable terminal have a significant influence on competitiveness of products. Accordingly, there is a desire to minimize power consumption in an idle state.

In FIG. 20, the CPU 1 employs a clock gating unit according to an embodiment. Thus, power consumption in the portable terminal may be minimized to enhance power consumption performance of the portable terminal.

As described above, a clock may be gated according to a state of a transaction detection signal. Thus, a power consumed in a bus system may be minimized or reduced to enhance power control performance of a system-on-chip (SoC).

By way of summation and review, an SoC may be implemented by integrating conventional multi-function blocks, e.g., intellectual properties (IPs) on a single chip. With the high integration of chips and increase in the amount of information between IPs, an SoC using a bus-based structure may encounter extensibility limitations. As an approach for overcoming the extensibility limitations, a network-on-chip (NoC) technology has been considered, which applies general network technologies within a chip to connect the IPs. As SoCs increase in integration density and size, and their operating speed is improved, low power consumption is an important factor to consider. This is because high power consumption may cause a temperature of a chip to rise, which may result in not only malfunction of the chip but also breakage of a package.

As described above, clock gating may be used as a power-saving technique for a bus system in an SoC. Embodiments may provide a clock gating method which may include obtaining a transaction detection signal using signals of a master interface; and basically gating a clock used in the operation of a bus bridge device mounted on a system bus according to a state of the transaction detection signal.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A clock gating circuit, comprising:
   a first counter configured to output a first signal;
   a second counter configured to output a second signal;
   a flip-flop configured to latch a third signal that is generated based on the first signal and the second signal, and configured to output a fourth signal; and
   a clock gating cell configured to latch a clock gating enable signal that is generated based on the third signal and the fourth signal, and configured to output a gate clock.

2. The clock gating circuit of claim 1, wherein the clock gating enable signal is generated based further on a valid read address, a valid write address and a valid write data.

3. The clock gating circuit of claim 1, wherein the clock gating cell is configured to output the gate clock in response to the clock gating enable signal.

4. The clock gating circuit of claim 1, wherein the clock gating cell includes a latch configured to latch the clock gating enable signal.

5. The clock gating circuit of claim 4, wherein the latch is configured to latch and output the clock gating enable signal according to a clock.

6. The clock gating circuit of claim 5, wherein the clock gating circuit gates the clock based on a state of a transaction detection signal.

7. The clock gating circuit of claim 1, wherein:
   the first counter is configured to count transactions during a write operation, and
   the second counter is configured to count transactions during a read operation.

8. The clock gating circuit of claim 1, wherein each of the first counter and the second counter receives a clock.

9. The clock gating circuit of claim 8, wherein the flip-flop receives the clock.

10. A clock gating circuit, comprising:
    a dynamic clock gate including a first counter configured to output a first signal, a second counter configured to output a second signal, and a flip-flop configured to latch a third signal that is generated based on the first signal and the second signal; and
    a clock gating cell including a latch, and configured to output a gate clock,
    wherein the first counter is configured to count transactions during a write operation,
    the second counter is configured to count transactions during a read operation, and
    the latch is configured to latch a clock gating enable signal that is generated based on a valid read address, a valid write address, a valid write data, the third signal, and an output signal of the flip-flop.

11. The clock gating circuit of claim 10, wherein each of the first counter, the second counter, the flip-flop, and the latch receives a clock.

12. The clock gating circuit of claim 11, wherein the clock gating circuit gates the clock based on a state of a transaction detection signal.

13. The clock gating circuit of claim 10, wherein the clock gating cell provides or blocks the gate clock in response to the clock gating enable signal.

14. The clock gating circuit of claim 10, wherein the first counter counts transactions based on the valid write address, a write address ready signal, a valid write response signal, and a write response ready signal.

15. The clock gating circuit of claim 10, wherein the second counter counts transactions based on the valid read address signal, a read address ready signal, a valid read data, a read signal, and a read last signal.

* * * * *